United States Patent [19]
Horiuchi et al.

[11] 4,413,275
[45] Nov. 1, 1983

[54] INK-JET COLOR PRINTING APPARATUS

[75] Inventors: Hideo Horiuchi; Kazutaka Yoshida, both of Kanagawa, Japan

[73] Assignee: Fuji Photo Film Co., Ltd., Kanagawa, Japan

[21] Appl. No.: 317,850

[22] Filed: Nov. 3, 1981

[30] Foreign Application Priority Data
Dec. 15, 1980 [JP] Japan .................. 55-175764

[51] Int. Cl.³ .............................................. H04N 1/46
[52] U.S. Cl. ........................................ 358/75; 358/78
[58] Field of Search ........................... 358/75, 78, 80; 346/74.7, 157

[56] References Cited

U.S. PATENT DOCUMENTS

| | | |
|---|---|---|
| 3,553,371 | 1/1971 | Suenaga . |
| 3,956,756 | 5/1976 | Paton .................................... 358/75 |
| 4,296,317 | 10/1981 | Kraus .................................... 358/75 |
| 4,319,268 | 3/1982 | Yamada .................................. 358/75 |

OTHER PUBLICATIONS

Japanese Patent Appln. No. 53-34328; Appln. date Mar. 24, 1978; Open date 10/1/79; Open No. 54-126416; Applicants: Nihon Denki Kabushiki Kaisha (plus translation).

A 3-Colour Ink Jet Plotter for Computer Graphics by Boris Smeds; pp. 181-195 (1973).
Siemens Review Magazine (1976) "Sicograph, Output Terminal for Colour Print-Outs" by Helmut Kraus et al., pp. 235-241.

*Primary Examiner*—Michael A. Masinick
*Attorney, Agent, or Firm*—Young & Thompson

[57] ABSTRACT

An ink-jet color printing apparatus is comprised of a rotary drum that bears the paper or other medium to receive the color printing and rotates in a primary scanning direction. A group of yellow ink-jet heads, a group of magenta ink-jet heads, a group of cyan ink-jet heads and a group of black ink-jet heads are provided, with each group of ink-jet heads arranged in the secondary scanning direction parallel to the axis of rotation of the drum. These ink-jet heads form simultaneously dot lines of four different colors. Groups of ink-jet heads of respective color are comprised of a plurality of ink-jet heads arranged in the primary scanning direction so as to form a plurality of dot lines constituting a single scanning line. A single picture element is formed by a dot matrix having $n \times m$ possible positions on a plurality of dot lines. Intermediate colors and color densities thereof can be achieved by combinations of several kinds of colored inks and dot patterns formed on a single matrix.

15 Claims, 10 Drawing Figures

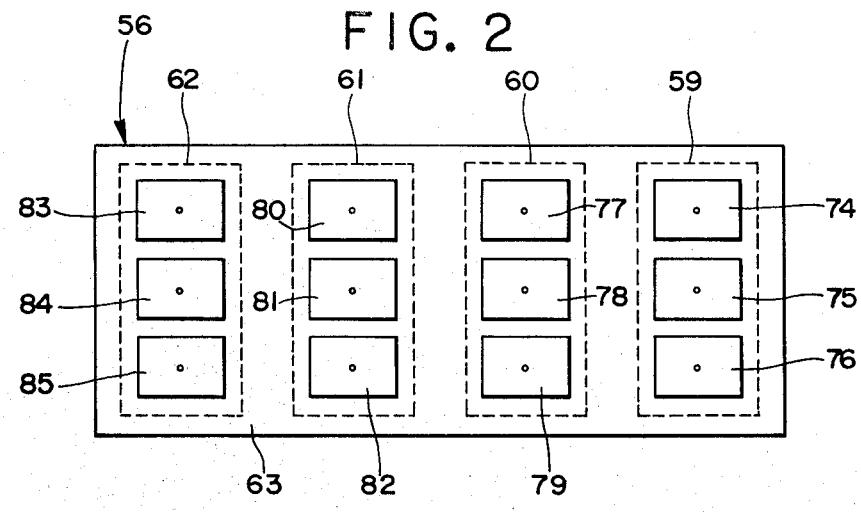
FIG. 2
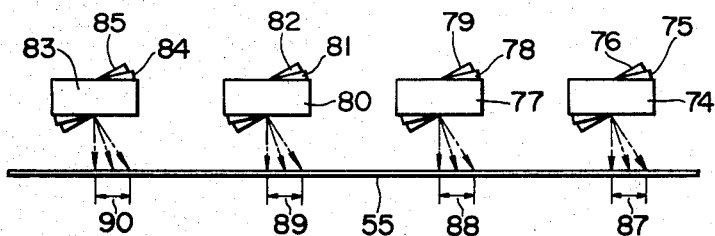
FIG. 3
FIG. 4  FIG. 5  FIG. 6
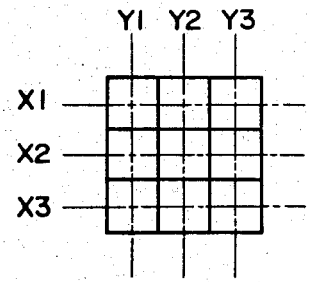
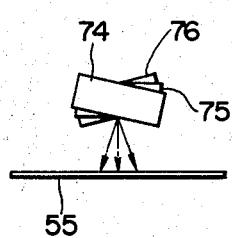
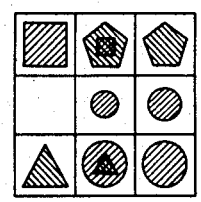

WAVE LENGTH (nm)

INK-JET COLOR PRINTING APPARATUS

BACKGROUND OF THE INVENTION

The present invention relates to an ink-jet color printing apparatus for forming, that is, painting color images with several kinds of colored inks and more particularly to an apparatus which is suitable for painting color images having half tones such as a color photograph.

Ink-jet printing apparatus in general use is constructed so that ink drops are ejected from an ink-jet head toward a recording paper and then deposited thereon in order to form the desired images. An apparatus wherein characters, pictures or the like are recorded in monochrome with a single-color ink, has the advantage that a high-speed recording can be performed without noisy operation; hence it is widely employed as an output unit of facsimile machines and computers.

Recently, ink-jet color printing apparatus using a plurality of colored inks, namely, yellow, magenta and cyan, has been proposed, wherein a printing head assembly is arranged opposed to a recording paper wrapped around a rotary drum rotating at a fixed speed (the direction of the rotation of the rotary drum is hereinafter called the primary scanning direction) and adapted to move intermittently in a direction perpendicular to the primary scanning direction (which latter direction is hereinafter called the secondary scanning direction) once each revolution of the rotary drum. The printing head assembly has three ink-jet heads for ejecting several colors of ink drops arranged in a row in the primary scanning direction so as to deposit ink drops on a single scanning line (that is, a picture elements line).

In the apparatus described above, however, there is the disadvantage that ink drops will be turbid or caused to flow due to the movement of the recording paper since the color drops are laid on the others previously deposited on the recording paper before the said other ink drops soak in or dry.

In the case of printing color images having half-tones and hues such as color photographs, it is necessary to be able to reproduce picture images with half-tones and hues closely similar to the original in at least sixteen steps of gradations. A drop-on-demand type of ink-jet head, whereby ink dots can be varied in size in accordance with voltages applied, is suitably used in general and is well known in this art. In this type of ink-jet head, ink drops are practically limited from 100 to 180$\mu$ in size so that images with half-tones in sufficient steps of gradation are hardly obtainable. To avoid the problem described above, it has been proposed to vary the number of ink dots appearing on a dot matrix having n possible positions in the row and m possible position in the column (n and m being integers) for one picture element so as to reproduce images with half-tones in a sufficiently large number of steps of gradation.

In the conventional apparatus described above, there is additionally the problem that in the case of using dot matrices, high speed printings are hardly achievable because of the provision of an ink-jet head for each color. Although the problem encountered could be dealt with by employing a plurality of ink-jet heads, one for each color, the result would be the arrangement of a plurality of ink-jet heads for the same color in the secondary scanning direction since ink-jet heads for a plurality of colored inks are arranged in the primary scanning direction.

In the case of the arrangement in the secondary scanning direction as described above, there are, due to the bulk of the ink-jet heads, spaces equal to several tens of scanning lines between two dot lines to be formed by two ink-jet heads of the same color. Therefore, the ink-jet heads additionally provided must be delayed in their actuation for a relatively long period of time; and hence it is necessary to provide a large scale delay circuitry.

OBJECTS OF THE INVENTION

The principal object of the present invention is to provide an ink-jet color printing apparatus wherein colored ink drops can be prevented from being turbid and flowing.

Another object of the present invention is to provide an ink-jet color printing apparatus which can paint an image with a sufficiently great number of steps of gradation at a high speed.

A further object of the present invention is to provide an ink-jet color printing apparatus which is simple in structure and which does not need a large scale time delaying circuit.

Still another object of the present invention is to provide an ink-jet color printing apparatus which can paint an image with hues closely similar to that of a color original.

SUMMARY OF THE INVENTION

These and other objects of the present invention are attained in conjunction with the present invention by using a head assembly in which a plurality of ink-jet heads for ejecting ink drops of the same color are arranged in the primary scanning direction and a plurality of ink-jet heads for ejecting ink drops different in color are arranged in the secondary scanning direction. A plurality of ink-jet heads for the same color are slightly delayed in their actuation according to their positions in the primary scanning direction to form a plurality of dot lines adjacent each other. Said plurality of dot lines makes up a single scanning line on which single-color dot matrices are formed. Scanning lines separated from each other are simultaneously formed of ink dots of a plurality of different colors, namely, yellow, magenta, cyan and black. The picture image data of picture elements on the four scanning lines are sequentially read out in an extremely short time depending on the positions in the secondary scanning direction of the four groups of yellow ink-jet heads, magenta ink-jets heads, cyan ink-jet heads and black ink-jet heads. The problem of providing a large scale time delay circuit can be avoided by driving a plurality of groups of ink-jet heads independently in accordance with the color image information which is read out from a memory device depending on the position of each group of ink-jet heads in the secondary scanning direction. Thus high speed printing is achieved. The ink-jet assembly is comprised of several groups of ink-jet heads separated in the secondary scanning direction so that the period of time, in which ink dots of different color are deposited one above another, becomes longer. As a result, ink drops of different colors deposited on a recording paper are not turbid and are not caused to flow thereon.

Signals of the color image information read out from the memory device are processed by masking by the use of a non-linear polynomial in a CPU, being converted into color density signals of primary colors, namely, yellow, magenta and cyan. The color density signals masked in a CPU are stored or memorized in four line buffer memories and are then fed to a UCR circuit by which color density signals of yellow, magenta, cyan and black are generated. As a result, color density signals are sampled correspondingly to colors of inks to be supplied to the ink-jet heads.

A color dot matrix pattern is automatically determined depending on the color density, in such a way that the positions and sizes of the ink dots to appear on a single color dot matrix are indicated, while the color density signals of each individual color are separated into three series of signals, which are fed to and memorized in buffer memories provided one for every ink-jet head, for controlling the positions and sizes of the ink drops to be ejected from the ink-jet heads. Each series of signals is, after the conversion into analog signals for driving an ink-jet head, supplied to each ink-jet head.

BRIEF DESCRIPTION OF THE DRAWING

Other objects, advantages and features of novelty of the invention will be evident to those skilled in the art from a reading of the following specification in conjunction with the accompanying drawings. These drawings show, for illustrative purpose only, preferred embodiments of the invention.

In the drawings:

FIG. 2 is a schematic plan view of a head assembly which is used with the present invention;

FIG. 3 is an illustrative schematic view showing a head assembly of FIG. 2 in a recording stage;

FIG. 4 is an illustration of a dot matrix;

FIG. 5 is an illustration of another arrangement of a group of ink-jet heads;

FIG. 6 is an illustration of a dot matrix on which several kinds of ink dots are deposited;

DETAILED DESCRIPTION OF THE INVENTION

Figure 1:
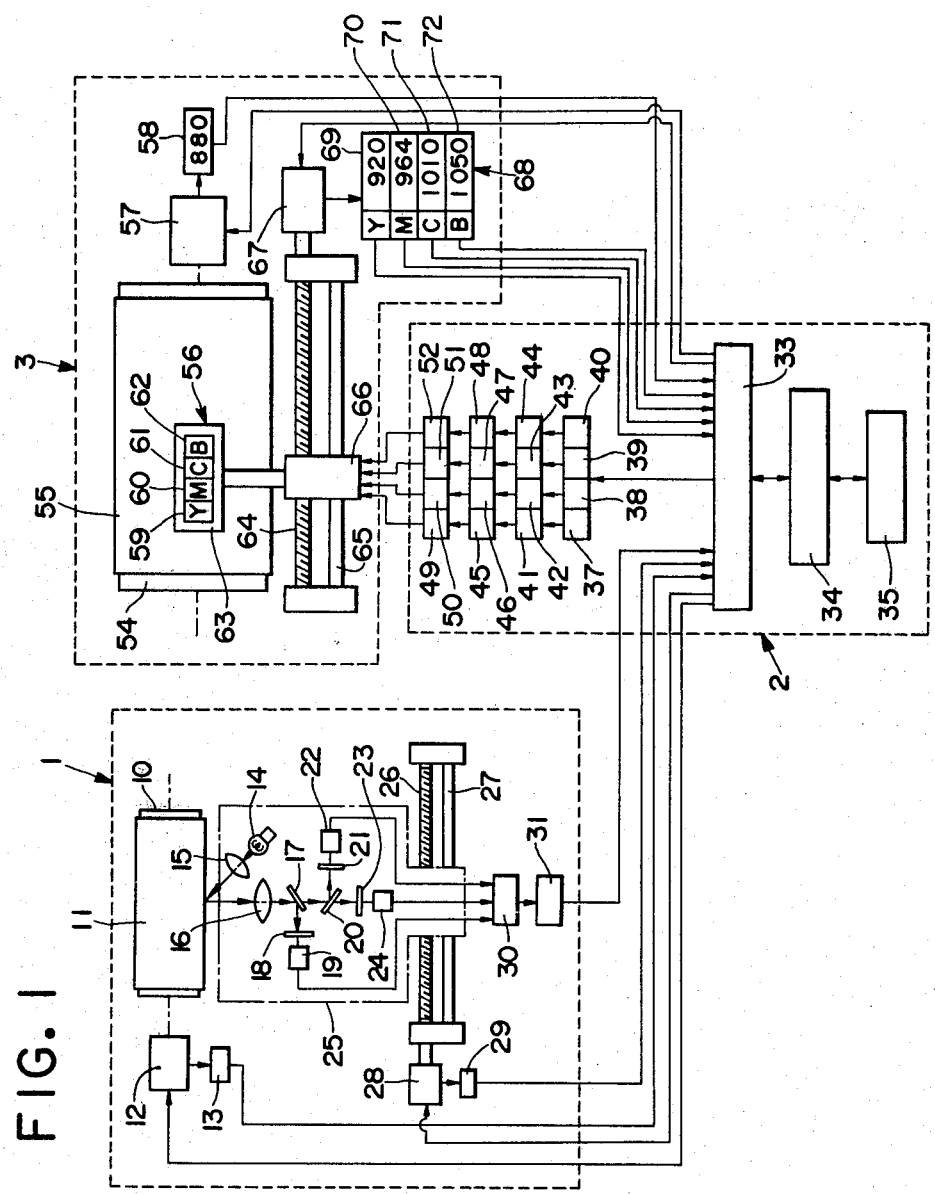
FIG. 1 is a schematic illustration of apparatus comprising a preferred embodiment of the present invention.

Referring now in detail to the drawings, wherein like reference numerals denote the same or similar elements throughout the several views, in a preferred embodiment illustrated in FIG. 1, there is schematically shown an ink-jet color printing apparatus comprising a color image information input unit 1 which reads the color information of color picture images of an original by a two-dimensional scanning of the color images and then converts them into digital signals, a color image processing unit 2 for memorizing the color image information as digital signals input from the color image information input unit 1 and for carrying out image processing such as masking, and a printer apparatus 3 for reproducing color pictures by ejecting colored ink-drops of a plurality of colors of inks from nozzles toward a recording medium, for instance a plain piece of paper, to form color pictures thereon. Although a digital color scanner is, in this embodiment, employed as a color image information input unit 1, a device which can convert video signals from a color TV camera into digital signals to thus feed them to a color image information processing unit 2 can also be used.

The color image information input unit 1 scans a color original 11 wrapped around a rotary drum 10 in two dimensions to measure the color densities of the three primary colors, namely blue, green and red, included in each picture element. The rotary drum 10 can be driven by means of a pulse motor 12 to scan primarily (in the direction of the rotation of the drum) the color original 11, while the actual position of the rotary drum 10 undergoing rotation is, in the primary scanning direction, detected by a pulse counter 13 for counting driving pulses fed to the pulse motor 12. The counter 13 is adapted to reset the contents thereof each time the rotary drum 10 makes one revolution so that the actual position of the drum 10 undergoing rotation can be directly read from the pulse counter 13 during each one revolution thereof.

Light rays from light source 14 are condensed by means of a lens element 15 to illuminate a spot on the color original 11. Light rays striking a half-mirror 17 through a lens element 16 after reflection from the color original 11 are separated into two beams, i.e. transmitted light rays and reflected light rays. The latter pass through a blue light transmitting filter 18 to impinge upon a light receiving device 19 responding only to blue light, thus being photoelectrically transmuted.

The light rays transmitted by mirror 17 are further directed to another half-mirror 20 to be again separated thereby into two beams, i.e. transmitted light rays and reflected light rays. The latter transmitted light rays, after passing through a red light transmitting filter 23, will impinge upon a light receiving device 24 responding only to red light and the other reflected light rays after passing through a green light transmitting filter 21 will pinge upon a light receiving device 22 responding only to green light, whereby red and green are also photelectrically transmuted. Consequently, color components in the proportion of the three primary colors included in the light rays reflected from each picture element, can be measured by light receiving devices 19, 22 and 24, respectively.

All of light source 14, lens elements 15 and 16, half-mirrors 17 and 20, color filters 18, 21 and 23, and light receiving devices 19, 22 and 24 are firmly attached to a movable table 25 which is adapted to move parallel to the axis of the rotary drum 10 by means of a feed screw shaft 26 and a guide rod 27 in order thus to scan secondarily (in the direction perpendicular to the primary scanning direction) the color original 11. The feed screw shaft 26 is driven by means of a pulse motor 28 the total number of pulses fed to which being counted by another counter 29.

Color component signals of three primary colors generated by light receiving devices 19, 22 and 24 are logarithmically converted into signals of color density by converters 30 and then converted into digital signals by A-D (analogue-to-digital) converters 31 which are provided one for each color. It is desirable to carry out, prior to said analogue-to-digital conversions of color signals, image processing such as noise reductions and/or image enhancement as required. Although the light source 14 is, in this embodiment, disposed outside of the rotary drum 10 so that one can measure the reflected light from the color original 11, in the case of using color originals with a high transmittance such as color films, color component measurements can be made by a color scanner which is comprised of a transparent rotary drum with a light source inside and light receiving devices for receiving light rays passing through the transparent color original.

The color image processing unit 2 comprises an interface 33, a central processing unit (CPU) 34, a memory 35, line buffer memories 37 to 40, under color removal (UCR) circuits 41 to 44, dot pattern generators 45 to 48 and printing head drivers 49 to 52.

When reading color image information into the color image processing unit 2, the CPU 34 feeds driving pulses to the pulse motor 12 to rotate the rotary drum 10 in the primary scanning direction followed by the rotation of the pulse motor 28 through a fixed angle every one revolution of the rotary drum 10 so that the color original 11 is two-dimensionally scanned to measure quantities of three primary color components of each picture element on a scanning line. Color density signals of the three primay colors, namely blue, green and red, are converted into digital signals, to be read into the CPU 34 through the interface 33. The said color density signals of three primary colors are memorized as color image information in memory cells the locations of which are addressed by position signals from counters 13 and 29 corresponding to the position of each picture element.

A conventional mini-computer can be employed as the CPU described above for controlling the color image information input unit 1 and printer 3, for controlling the memorizing or reading out of the color image information, and for carrying out the various image processings.

These image processings fall into categories such as color corrections, γ (gamma) correction, image composition, character superimposition, magnification and reduction of pictures in size, and the like, which are easily carried out with computer image processing techniques well known in the art. The image processed will be confirmed by the use of a television monitor and furthermore can be reformed following observation of the image displayed so as to reproduce a desirable image. Several examples of these well-known techniques are as follows:

(1) Color correction. Color correction is a masking procecdure for reproducing a color image having colors closely similar to those of the original image. In this procedure, the color balance among the three primary colors is corrected, while color density signals of three primary colors are converted into those of three primary colors of coloring materials, namely, cyan, magenta and yellow. While a masking procedure is applied to the density signals of three additive primary colors read out from the mrmory 35 at the time of printing, it may be carried out prior to the memorizing of color density signals of three primary colors from the color image information input unit 1 into the memory 35, or may be applied to color density signals read out from the memory 35. In the case of the latter, the signals processed are again memorized in the same memory 35.

(2) γ Correction. The γ-correction means correction of the gamma value controlling in a tone reproduction. The γ-correction is conducted in case, for instance, it is necessary to reproduct an image with high contrast or to reproduce an image with its shadows intensified.

(3) Image composition. Image composition serves to replace a portion of the principal picture image with an auxiliary picture image.

(4) Character superimposition. Character superimposition serves to superimpose characters on an image. This procedure is conveniently applicable to producing commercial posters or the like.

(5) Magnification reduction. These procedures aim to reproduce a picture image magnified or reduced in size, partially or wholly.

In procedures (1) and (2) described above, correcting conditions should be selected so that a color image is reproduced which is closely similar to the original. But if it is desirable, correcting conditions under which a color image with a different appearance from the original is reproduced may be intentionally selected.

The line-buffer memories 37 to 40 can memorize color image information for each picture element on four scanning lines which are sequentially read out from the memory 35. When simultaneously memorizing and reading out data, it is desirable to provide two line-buffer memories for every scanning line, and thus a total of eight line-buffer memories for four scanning lines.

Four UCR circuits 41 to 44 are provided corresponding one to each line-buffer memory whereby the masking color density signals of yellow, magenta and cyan of each picture element are reduced somewhat and whereby the amount of black ink to be used is determined, thereby to provide the color density signals of yellow, magenta, cyan and black. A dot pattern generator 45 to 48 is provided for each UCR circuit, with its input terminal connected with the output terminal of the latter. Consequently the dot pattern generator 45 receives only the color density signals of yellow output from the UCR circuit 41, the dot pattern generator 46 receives the color density signals of magenta output from the UCR circuit 42, the dot pattern generator 47 receives the color density signals of cyan output from the UCR circuit 43 and the remaining one receives the density signals of black output from the UCR circuit 44. In each of the dot pattern generators 45 to 48, the locations and sizes of the ink dots to be depicted in a dot matrix having n×m, for instance 3×3, possible positions for constructing an image element are determined in accordance with color density signals by referring to a predetermined table. Thus the dot pattern generator 45, when a series of yellow color density signals are fed thereto, converts these into three series of yellow color dot signals. In the case of a dot matrix of 4×4 possible positions for an image element, a dot pattern generator for producing four series of color dot signals can be employed.

Four printing head driving means 49 to 52, each of which includes three driving circuits, are provided corresponding to dot pattern generators 45 to 48, respectively. Printing head driving means 49 to 52, each of which includes three printing head driving circuits for each color and thus a total of 12 circuits for four colors, receive three series of dot signals from dot pattern generators 45 to 48, respectively. Each printing head driving circuit selects one of voltage values, for instance, one of six voltage values into which the voltage difference between 80 to 250 volts is divided, in accordance with a dot signal to provide a printing head driving signal by modulating the voltage with a carrier signal of, for instance, 20 KHz frequency.

The ink-jet printer apparatus 3 ejects a series of ink drops from a head assembly onto a recording medium, for instance a white paper 55, wrapped around a rotary drum 54, to form a color image. The rotation of the rotary drum 54 is caused by a pulse motor 57 to which driving pulses are fed from the CPU 34. The pulses fed to the pulse motor 57 are counted by a pulse counter 58 which is adapted to reset to zero each time the rotary drum 54 makes one revolution so that the position of a head assembly 56 relative to the white paper 55 is indicated in the primary scanning direction, while signals of the information of positions in the primary scanning direction can be fed to the CPU 34.

As shown in FIG. 1, provided along and close to the outer surface of the rotary drum 54 is the head assembly 56 which is comprised of four groups of ink-jet heads 59 to 62 for yellow, magenta, cyan and black. Each group of ink-jet heads is comprised of three ink-jet heads of the conventional drop-on-demand type to which the particular printing fluid or ink is supplied from a reservoir (not shown).

All the groups of ink-jet heads 59 to 62 are simultaneously driven to form three dot lines on the recording paper 55, so that a single color picture element is formed in the form of a dot matrix consisting of three dot lines on each of which three ink dots may be distributed. A picture element with half-tone can be formed in about 30 to 70 steps of gradation depending on the variation of sizes and arrangement of ink dots to be distributed in a single dot matrix having three possible positions in both the row and the column. A picture element having intermediate colors can be formed in such a way as to arrange ink dots of four kinds of colors having various sizes in a matrix; and this is similar in its effects to the additive color mixture or the substractive color mixture technique.

A plurality of groups of ink-jet heads are arranged in the secondary scanning direction with separation from each other a distance comprising the width of several tens of scanning lines therebetween; hence ink drops can be prevented from being turbid and flowing since the colored ink drops previously deposited on a recording paper 55, after they soak in, are laid by the other color ink drops. Furthermore, because it suffices to mount a plurality of groups of ink jet heads 59 to 62 on a straight support member, the head assembly can be constructed with simplicity, whilst the adjustment of the distance between the head assembly and the rotary drum can be performed easily compared with conventional head assemblies arranged in the direction of the circumference of a rotary drum. The distances between each two adjacent groups of ink-jet heads can be adjusted to differ from each other depending on the characteristics of the inks and recording papers used. They can as well be adjusted to be equal distances. Consequently it is possible to make the distance between groups of ink jet heads 59 and 60 larger than that between groups of ink jets 61 and 62 in order to prevent more completely ink drops from becoming turbid and flowing.

The head assembly 56 is attached to a movable supporting member 66 which can be moved in a direction parallel to the axis of the rotary drum 54 by means of a feed screw shaft 64 and a guide rod 65. The feed screw shaft 64 is adapted to be rotated by a pulse motor 67 which is caused to rotate by the output of driving pulse signals from the CPU 34. A counter 68 counts the driving pulses fed to the pulse motor 67 to indicate the number of driving pulse signals. Here, since a plurality of groups of ink-jet heads are arranged with separation in the secondary scanning direction, it is necessary for each group of ink jet head to detect its position. For this, each group of ink jet heads 59 to 62 is provided with a scanning counter 69 to 72, respectively, which begins to count driving pulses subsequently to a resetting thereof to the value initially set in accordance with the position of the group of ink jet heads relative to the rotary drum 54.

When printing a color image, the CPU 34 generates driving pulse signals to drive the pulse motors 57 and 67 in such a way as to move the head assembly 56 in the secondary scanning direction by a regular distance equal to a scanning pitch every time the rotary drum 54 makes one revolution. As the positions of ink jet heads 59 to 62 are detected by counters 69 to 72, respectively, color density signals of three primary colors of picture elements on four scanning lines are sequentially read out according to the respective line from the memory by addressing the lines depending on said positions detected when groups of ink-jet heads 59 to 62 should simultaneously eject ink drops toward a recording paper. Said color density signals of three primary colors are masked to generate color density signals of the primaries, namely, yellow, magenta and cyan, the signals being written sequentially in an extremely short time into line buffer memories 37 to 40 provided for the respective groups of ink jet heads 59 to 62. Furthermore, the color density signals of the primaries memorized in the line buffer memories 37 to 40 are converted into four color density signals of yellow, magenta, cyan and black by means of the UCR circuits 41 to 44 and thus fed to the dot pattern generators 45 to 48 for four colors in each of which a single series of color density signals fed thereto is converted into three series of dot signals. A series of dot signals is read out depending on the position signals from the counter 58 in order to position the head assembly 56 relative to the rotary drum 55.

The three series of dot signals are fed to head driving means 49 to 52 and then are converted into analogue head driving voltage. This head driving voltage causes the group of ink jet heads to eject ink drops toward the recording paper 55 running in the primary scanning direction, thus painting three rows of ink dots. The same procedure described above is replicated for the other colors. Therefore four lines of different color, namely cyan, magenta, yellow and black, each line of which is constructed from three rows of the same color ink dots, are simultaneously painted. As a result, a dot matrix of three possible positions on the row and column constructing one picture element is filled with four different colors of ink dots by the motion of the head assembly 56 in the secondary scanning direction by steps of one scanning pitch equal to three times a dot's size, so as to compose the intermediate colors.

FIG. 2 shows a head assembly, in which a group of ink-jet heads 59 for yellow comprises three ink-jet heads 74 to 76 arranged with separation by a proper distance in the primary scanning direction. Other groups of ink-jet heads for magenta, cyan and black are of the same constitution and arrangement as that described for yellow. Each of ink-jet heads 74 to 85 is provided with an ink ejection nozzle at the center thereof. In a dot matrix having m possible positions in the column and n possible positions in the row, in the case of m=4, it suffices to provide a group of ink-jet heads with four ink-jet heads in the primary scanning direction. Furthermore, since n will depend on the number of ink drops ejected from one ink-jet head, this can be done electrically and so irrespective of the number of ink-jet heads.

As shown in FIG. 3, three ink-jet heads 74 to 76 for yellow are arranged at different angles so as to eject ink drops at positions shifted from each other by increments of distance equal to the size of a dot. In the embodiment shown, the first ink-jet head 74 is disposed parallel to the plane of the recording paper 55 and the other two heads 75 and 76 are tilted at an angle to each other. Therefore, dot matrices corresponding to picture elements on a line 87 extending in the plane which is perpendicular to the plane of the drawing are filled with ink dots by ink-jet heads 74 to 76 due to the recording paper 55 running in a direction perpendicular to the plane of the drawing. That is to say, in the case of forming one picture element by the use of a dot matrix having three possible positions (which can be through of as cells) on each of the twos and columns as shown in FIG. 4, three cells (Y1X1, Y1X2, Y1X3) on the Y1 axis in the primary scanning direction are printed with ink dots in sequence by the ink-jet head 74, and other cells on the Y2 and Y3 axes are printed by the ink-jet heads 75 and 76, respectively, in the same manner as described for the cells on the Y1 axis. The grid shown in FIG. 4 indicates the positions in which ink drops are deposited.

As the ink-jet head 75 is disposed in such a way that its nozzle is spaced from the nozzle of the ink-jet head 74 in the primary scanning direction by a suitable distance, the signal for driving the ink-jet head 75 is delayed as compared with the signal for the ink-jet head 74 by the amount of time corresponding to that which is necessary for the former to deposit ink drops over the said distance. The relationship between the ink-jet heads 74 and 76 is much the same as for the ink-jet head 75. Therefore ink drops of the same color are accurately positioned in the respective cells.

In the same manner as described above, the ink-jet heads 77 to 79 for magenta form ink dot matrices of picture elements on the scanning line 88; the ink-jet heads 80 to 82 for yellow form ink dot matrices on the scanning line 89; and the ink-jet heads 83 to 85 form ink dot matrices on the scanning line 90. Now, the ink-jet heads 74, 77, 80 and 82 forms ink dot matrices of picture elements on the same secondary scanning line, the ink-jet heads 75, 78, 81 and 84 form ink dot matrices on the same secondary scanning line; but this line is different from the secondary scanning line described just above; and the ink-jet heads 76, 79, 82 and 85 form ink dot matrices on the same secondary scanning lines; but again this line is different from the other two scanning lines. As a result, ink-jet heads 74 to 85 deposit ink drops simultaneously in twelve matrix cells which are allocated to four picture elements and hence distributed to each of four scanning lines by three cells.

FIG. 5 illustrates another arrangement of a group of ink-jet heads, wherein ink-jet heads 74 and 76 are inclined at an angle in different directions to the ink-jet head 75, which last is parallel to the recording paper.

FIG. 6 shows an enlarged view of picture elements formed in an ink dot matrix, wherein rounds indicate magenta ink dots, triangles indicate yellow ink dots, squares indicate cyan ink dots and pentagons indicate black ink dots. This matrix is a square with a side of, for instance, 500μ. Ink dots to be deposited in cells of the dot matrix are varied in seven steps of sizes from a maximum size of 180μ to a minimum size of 100μ.

Figure 7:
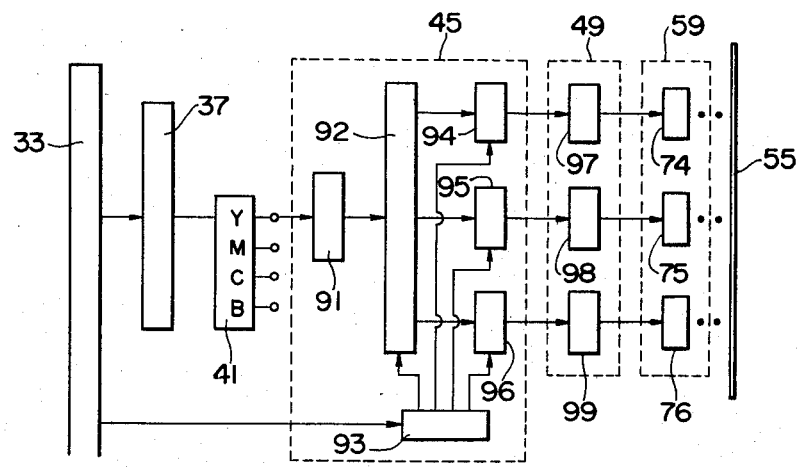
FIG. 7 is a block diagram showing a control circuit for actuating a group of ink-jet heads.

FIG. 7 is a block diagram of electronic circuitry for controlling the actuation of three ink-jet heads for yellow. Color density signals of three primary colors for each picture element stored or memorized temporarily in the line buffer memory 37 are fed to the UCR circuit 41. Yellow color density signals extracted from the UCR circuit 41 are decoded by a decoder 91 to address a table in a table memory 92 wherein dot patterns to be formed according to color densities are previously stored in the form of combinations of positions of matrix cell and dot signals (according to the voltage with which an ink-jet head is driven). The reading out of dot signals of matrix cells Y1X1, Y1X2 and Y1X3 is performed by addressing, at first, the line of Y1 and then counting each address of X with an XY address counter as shown in FIG. 4. Dot signals of the line of Y1 are memorized into a buffer memory 94 in positions addressed by the XY address counter 93. Dot signals of lines of Y2 and Y3 are memorized in buffer memories 95 and 96, respectively, in the same manner as described for the line Y1.

It should be noted that dot signals of the same line of X are memorized in different addresses because the leading addresses in the buffer memories 95 and 96 are shifted by the number of dots corresponding to the distance from the ink-jet heads 75 and 76 to the ink-jet head 74. Dot signals of Y axes for one scanning line memorized in buffer memories 94 to 96 which are addressed by position signals from the counter 69 are sequentially read out. Further dot signals memorized in buffer memories 95 and 96 read out with a delay time corresponding to the predetermined number of dots because the leading addresses of the buffer memories 95 and 96 are different from each other.

As the leading addresses of buffer memories 95 and 96 are shifted respectively from that of buffer memory 94 by the number of ink dots corresponding to the distance between ink-jet heads 75 and 76 and the ink-jet head 74, signals of dots to be printed on the same axis X are memorized in different positions of addresses. The buffer memories 94 to 96 are addressed by position signals from the counter 60 to read signals out sequentially over one scanning line. From the description above, it will be seen that signals in buffer memories 95 and 96 are delayed to be read out due to their leading address being shifted. It is to be noted that digital delaying circuits can be provided in order to delay signals read out from the buffer memories. Dot signals of the Y axis converted into analogue signals at head driving circuits 97 to 99 and biassed are fed to ink-jet heads 74 to 76. Thus ink-jet heads 74 to 76 are simultaneously driven to print ink dots on the recording paper 55.

Figure 8:
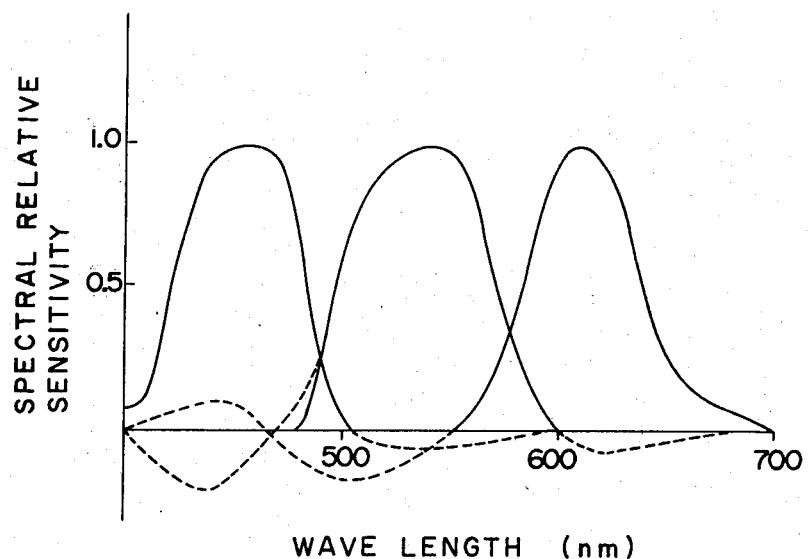
FIG. 8 is a graphical representation showing spectral characteristics of color filters used for color separation.

FIG. 8 is a graphical representation showing spectral characteristic curves of the sensitivity of separation filters, namely, a blue color filter, a green color filter and a red color filter which are used for the photometry of color separation. It is desirable to employ filters having spectral characteristics of sensitivity equal or approximate to the CIE color matching function or its linear combinations. That is, although various colors of a color original are visually sensed as the same colors, it is possible that these colors are in fact multifarious as to their spectral characteristics. Thus it may be said that it is preferable to use a photometry system having a spectral characteristic which conforms to that of human eyes.

The spectral characteristic of sensitivity described above may be that which satisfies the Luther condition. In FIG. 8, solid curves represent spectral characteristics of sensitivity of color filters used in practice with the present invention and are approximative to the CIE color matching function in its characteristic. But the dotted curves illustrate the ideal spectral characteristics of sensitivity based on the color matching function.

It is desirable to carry out the masking procedure in the CPU 34 by the use of a polynomial function including nonlinear terms in order to obtain a fine color reproducibility. The reason for this is that there is an extremely high degree of non-linearity between the amount of ink and the optical density depending on combinations of the type of inks and recording papers, the type of ink dotting or the like. So the form of the non-linear masking should be selected having regard for the characteristics of photometry and inks, and desirably utilizing quadratic terms, logarithmic terms, exponential function terms and the like as non-linear terms. The following matrix having variations which are, for example, color density signals of three primaries, is utilized in the non-linear masking:

$$\begin{bmatrix} Y_1 \\ Y_2 \\ Y_3 \end{bmatrix} = \begin{bmatrix} A_{11} A_{12} A_{13} A_{14} \ldots A_{1n} \\ A_{21} A_{22} A_{23} A_{24} \ldots A_{2n} \\ A_{31} A_{32} A_{33} A_{34} \ldots A_{3n} \end{bmatrix} \begin{bmatrix} X_1 \\ X_2 \\ X_3 \\ X_1^2 \\ X_2^2 \\ X_3^2 \\ X_1 X_2 \\ X_2 X_3 \\ X_3 X_1 \\ \cdot \\ \cdot \\ K \end{bmatrix}$$

$X_1$: blue color density signal
$X_2$: green color density signal
$X_3$: red color density signal
$Y_1$: cyan color density signal
$Y_2$: magenta color density signal
$Y_3$: yellow color density signal
$A_{ij}$: coefficient
$K$: constant term (total number of terms: n)

Figure 9:
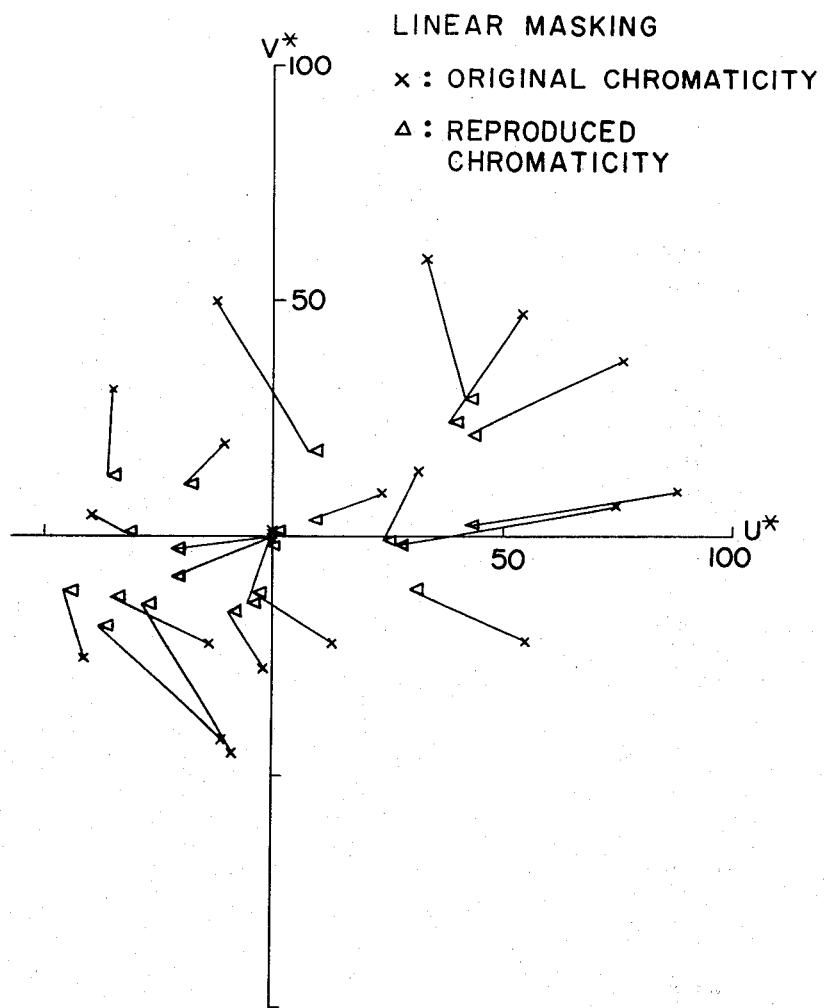
FIG. 9 is a graphical representation showing characteristics of color reproduction with the use of linear masking.
Figure 10:
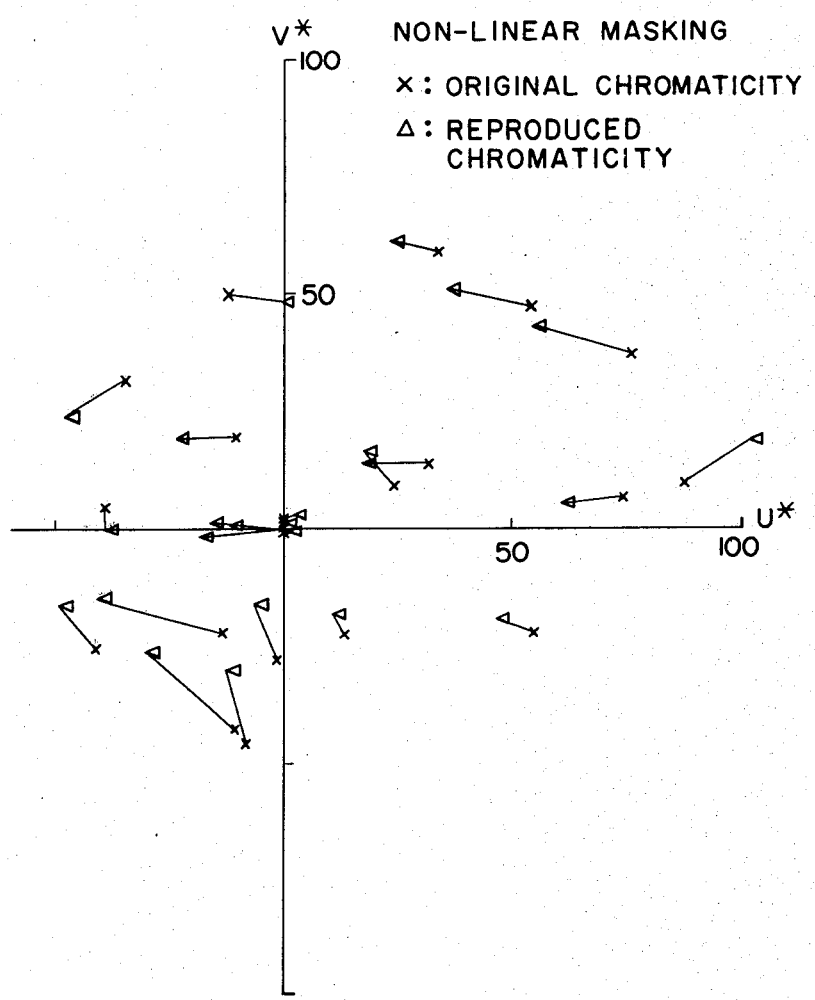
FIG. 10 is a graphical representation showing characteristics of color reproduction similar to FIG. 9 but with the use of non-linear masking.

FIG. 9 shows characteristics of color reproduction of the image which is reproduced from the image of the 24 colors Macbeth color chart printed on a color paper as an original image by the application of the masking procedure with the color correcting function, in which the said matrix is rearranged as a ten-terms polynomial composed of the primary terms, the quadratic terms and the constant term, by an ink-jet color printer. The chromaticity in FIG. 9 is represented in the CIE 1964 (U* V* W*) colorimetric reference system.

FIG. 9 shows characteristics of color reproduction of image reproduced in the same manner as described relating to FIG. 9 except that there is used a four-terms polynomial composed of the primary terms and constant term. As is obvious from the figures, the non-linear masking technique is far better as to color reproduction than the linear masking technique.

In a preferred embodiment of the invention, a scanning apparatus is comprised of a rotary drum rotatable in the primary scanning direction and a head assembly movable in the secondary scanning direction; however, in the case of recording media such as hard sheets like metal or sheets of large dimensions, it may be so modified as to cause the head assembly to scan only two-dimensionally a recording medium.

As many apparently widely different embodiments of this invention may be made without departing from the spirit and scope thereof, it is to be understood that the invention is not limited to the specific embodiments thereof except as defined in the appended claims.

What is claimed is:

1. An ink-jet color printing apparatus for forming a color picture in the form of dot patterns with ink dots of a plurality of colors on a recording medium comprising:

means for converting into digital signals the color image information of a picture element to be reproduced;

memory means for memorizing said digital signals of the color image information;

means for recording said digital signals from said converting means into said memory means;

image processing means for masking said digital signals of the color image information;

support means for supporting a said record medium thereon;

head assembly means closely adjacent said recording medium, said head assembly means including at least a group of ink-jet heads for ejecting yellow ink drops, a group of ink-jet heads for ejecting magenta ink drops and a group of ink jet heads for ejecting cyan ink drops arranged in a row extending transversely of the direction of advance of said recording medium so as to form dot matrices on a plurality of lines to be scanned thereby;

two-dimension scanning means for scanning the surface of said recording medium by a continuous motion of said head assembly relative to said recording medium and an intermittent motion of said head assembly relative to said recording medium in the direction perpendicular to that of said continuous motion;

means to cause said continuous and intermittent motions by a motion of said head assembly or recording medium;

detecting means for detecting positions of said head assembly relative to said recording medium in the direction of said continuous motion to generate first signals;

a plurality of detecting means for detecting positions of said groups of ink-jet heads, respectively, in the direction of said intermittent motion to generate second signals;

information read-out means for reading the color image information of picture elements on at least three scanning lines to be simultaneously painted out from said memory means corresponding to said second signals; and means for each group of ink-jet heads to convert color density signals of a single color of ink drops to be ejected by said ink-jet heads extracted from said color image information into analog signals and to feed said analog signals to said ink-jet heads corresponding to said first signals in order to drive them.

2. An ink-jet color printing apparatus as defined in claim 1, further comprising a group of ink-jet heads for ejecting black ink drops to form dot matrices on a line to be scanned thereby.

3. An ink-jet color printing apparatus as defined in claim 1, wherein said image processing is performed prior to memorizing said digital signals of the color image information in said memory means.

4. An ink-jet color printing apparatus as defined in claim 1, wherein said image processing is applied to said signals of the color image information read out from said memory means.

5. An ink-jet color printing apparatus as defined in claim 1, wherein said support means for supporting a recording medium is a rotary drum and said two dimensional scanning means includes a driving means for causing said rotary drum to rotate and a moving means for causing said head assembly to move intermittently in a direction perpendicular to that of the rotation of said rotary drum.

6. An ink-jet color printing apparatus as defined in claim 1, wherein each said group of ink-jet heads includes a plurality of ink-jet heads arranged in a row in the direction of the rotation of said rotary drum to paint a plurality of dot lines forming one scanning line for a single color.

7. An ink-jet color printing apparatus as claimed in claim 6, wherein said ink-jet heads are inclined at an angle to each other so as to eject ink drops at intervals equal to the size of an ink dot.

8. An ink-jet color printing apparatus as defined in claim 7, wherein each said group of ink-jet heads is comprised of three ink-jet heads.

9. An ink-jet color printing apparatus as defined in claim 7, wherein each said ink-jet head is a drop-on-demand type.

10. An ink-jet color printing apparatus for reproducing a color picture of originals by using a plurality of colored inks on a recording medium comprising:
photometric means in three-color separation for measuring light from picture elements by two-dimensionally scanning said color originals;
means for logarithmically compressing signals of the color image information from said photometric means;
means for converting said logarithmically compressed signals of the color image information into digital signals;
memory means for memorizing said digital signals;
a rotary drum for supporting a said recording medium and advancing it in the direction of rotation thereof;
head assembly means closely adjacent said recording medium, which includes at least a group of ink-jet heads for ejecting yellow ink drops, a group of ink-jet heads for ejecting magenta ink drops and a group of ink-jet heads for ejecting cyan ink drops arranged in a row extending transversely of the direction of advance of the recording medium so as to form dot matrices on lines to be scanned thereby, respectively, each said group of ink-jet heads comprising three ink-jet heads for forming three dot lines which form one of said lines to be scanned;
means for moving intermittently said head assembly in a direction perpendicular to that of said rotation of said rotary drum;
means for detecting positions of said head assembly in the direction of said rotation of said rotary drum to generate first signals;
a plurality of means for detecting positions of said groups of ink-jet heads in the direction of said intermittent motion of said head assembly to generate second signals;
means for reading out signals of the color image information of picture elements of a plurality of scanning lines to be formed simultaneously corresponding to said second signals and for generating color density signals of three primary colors by masking said signals read out;
means for each said group of ink-jet heads for memorizing color density signals of picture elements of said each line to be scanned;
means for each said group of ink-jet heads for extracting color density signals depending on the color of ink drops to be ejected to generate a series of dot signals which causes said ink-jet heads to form a plurality of dot lines forming a single scanning line;
means for memorizing said series of dot signals; and
means for reading out said series of dot signals depending on said first signals and for converting said dot signals read out into analogue signals to feed them to each said group of ink-jet heads in order to drive them.

11. An ink-jet color printing apparatus as defined in claim 10, wherein said means for generating a series of dot signals controls the sizes and positions of ink dots to be formed on a dot matrix according to color density signals.

12. An ink-jet color printing apparatus as defined in claim 10, wherein each of said groups of ink-jet heads is comprised of three ink-jet heads of a drop-on-demand type to form three dot lines which are separated from each other at an interval equal to the size of a single dot.

13. An ink-jet color printing apparatus as defined in claim 10, wherein said photometric means in three color separation includes color separation filters having spectral characteristics approximate to the CIE color matching function.

14. An ink-jet color printing apparatus as defined in claim 10, further comprising a group of ink-jet heads for ejecting black ink drops and means for generating color density signals for the black ink according to color density signals of three primaries.

15. An ink-jet color printing apparatus as claimed in claim 10, said means for moving intermittently said head assembly being comprised by a feed screw shaft extending in the direction of the axis of said rotary drum, a movable table engaged with said feed screw shaft and holding said head assembly thereon, a guide member for preventing said movable table from rotating about the axis of said feed screw shaft, and a motor for rotating said feed screw shaft in such manner that said movable table moves the distance between two adjacent said scanning lines each time said rotary drum makes one revolution.

* * * * *